United States Patent

Vogt et al.

[15] 3,674,839

[45] July 4, 1972

[54] PRODUCTION OF GLYCEROL ACETATES

[72] Inventors: Wilhelm Vogt, Efferen near Cologne; Kurt Sennewald, Hermulheim near Cologne; Hermann Glaser, Lechenich near Cologne, all of Germany

[73] Assignee: Knapsack Aktiengesellschaft, Knapsack near Cologne, Germany

[22] Filed: Nov. 25, 1970

[21] Appl. No.: 92,573

[30] Foreign Application Priority Data

Dec. 1, 1969 Germany ....................P 19 60 142.4

[52] U.S. Cl. .........................................260/491, 260/497 A
[51] Int. Cl. ...........................................C07c 67/00
[58] Field of Search .....................................260/491

[56] References Cited

UNITED STATES PATENTS 2,316,604  4/1943  Loder et al. ..........................260/491
2,911,437  11/1959  Keith .....................................260/491

*Primary Examiner*—Lorraine A. Weinberger
*Assistant Examiner*—Vivian Garner
*Attorney*—Connolly and Hutz

[57] ABSTRACT

Production of glycerol triacetate and glycerol diacetate by reacting allyl acetate, acetic acid and molecular oxygen at elevated temperatures in liquid phase. The compounds are more particularly produced by reacting a solution of allyl acetate in acetic acid with an oxygen/inert gas-mixture at 80° to 250° C. and under 1 to 200 atm. abs., in the absence of catalysts.

6 Claims, 1 Drawing Figure

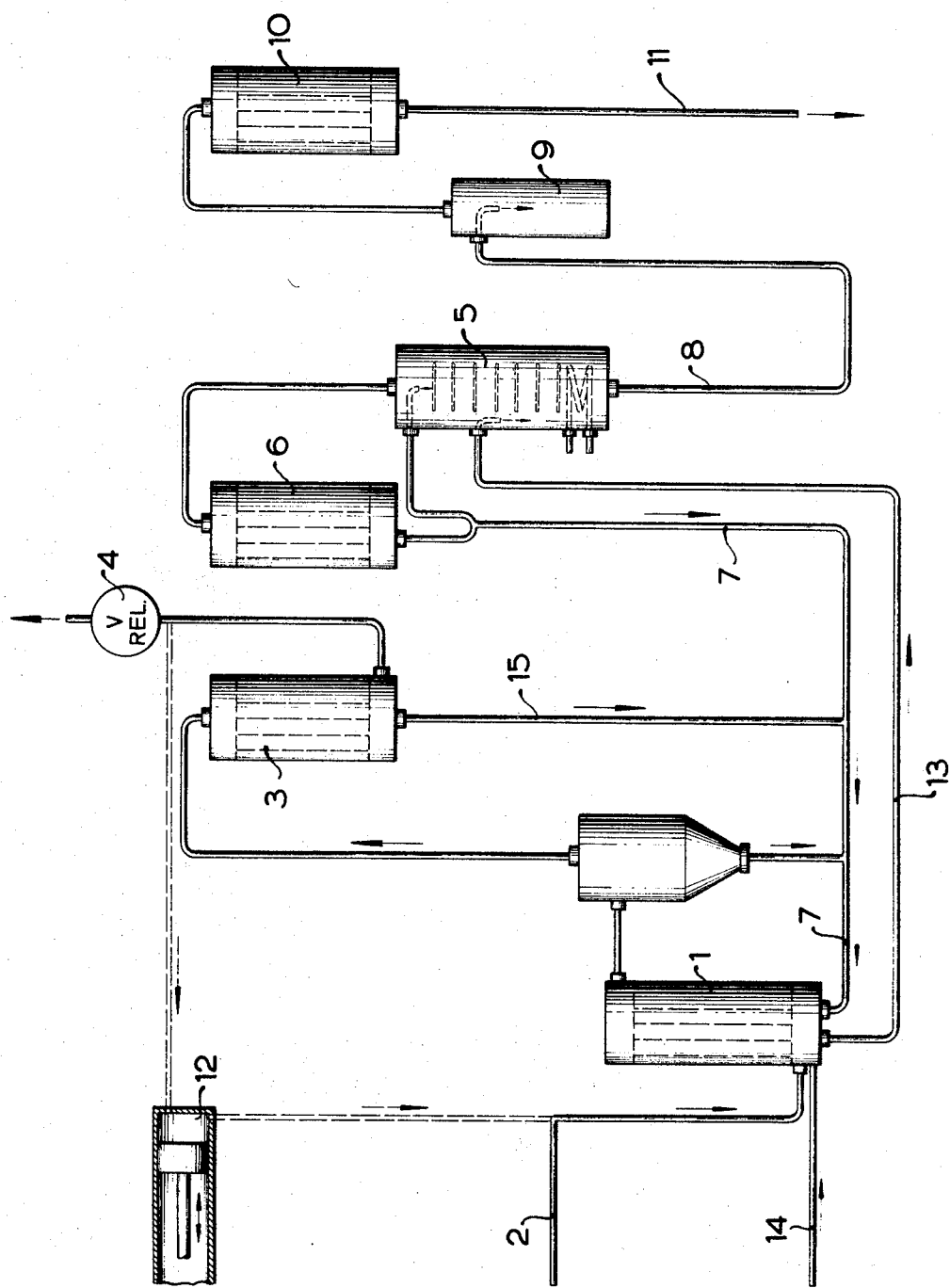

PRODUCTION OF GLYCEROL ACETATES

By the successful transformation of propylene into allyl esters by reaction with carboxylic acids and oxygen in contact with carrier-supported catalysts containing noble metals of group VIII of the Periodic System as their active components, allyl alcohol esters have recently become readily available commercial products. In view of this, it is highly desirable to have a process for the production of their daughters, particularly glycerol and its esters, under commercially attractive conditions.

Various processes for the transformation of allyl alcohol by reaction with peroxidic compounds, such as peracetic acid or hydrogen peroxide, in contact with a heavy metal catalyst (e.g. tungsten, molybdenum, vanadium) into glycidol, which in turn can readily be transformed into glycerol, have already been described. In all of these processes, an aqueous solution of allyl alcohol is used for reaction. As a result of this, the reaction products are also obtained in the form of an aqueous solution of glycerol from which concentrated glycerol is successively recovered. A further problem is the responsiveness of glycerol to traces of heavy metal salts and acids, which originate from the epoxidation of allyl alcohol and may be retained by the reaction products, and effect decomposition of the glycerol during distillation.

The epoxidation of allyl acetate without prior hydrolysis to allyl alcohol would appear to be a quite suggestive procedure. The reaction of allyl acetate with hydrogen peroxide in contact with a heavy metal catalyst has, however, been found to produce poor yields only.

All of these processes for the production of glycerol or its derivatives from allyl alcohol or allyl acetate call for the commercially disadvantageous use of costly peroxidic oxygen, in whatever form of compound it may appear.

A further process for the manufacture of glycerol triacetate has been disclosed in U.S. Pat. No. 2,911,437, wherein a mixture of allyl acetate and acetic acid is reacted with pure oxygen in liquid phase, at temperatures of between 25° and 200° C, at atmospheric pressure, and in contact with catalytically active amounts of one or more bromides of the metals comprising vanadium, chromium, manganese, iron, cobalt, nickel, lanthanoids, molybdenum, tungsten or tin. The rather long reaction period of substantially 6 hours is not fully satisfactory in this process.

We have now unexpectedly discover that glycerol acetates are very readily obtainable by the introduction of oxygen, diluted with inert gas for reasons of precaution, into a solution of allyl acetate in acetic acid. The reaction may be carried out at temperatures of between 80° and 250° C. Preferably, however, it is carried out under overpressure in view of the fact that the mixture has a vapor pressure as high as several atmospheres (gauge pressure) in the temperature range of between 125° and 180° C, within which the reaction substantially occurs, and further in view of the fact that a satisfactory partial pressure value is required to be established for the oxygen in gas phase to have a fair solubility in liquid phase. A pressure range of between 1 and 200 atmospheres absolute, advantageously between 5 and 100 atmospheres absolute, should preferably be used. The reaction of the present invention occurs in the absence of catalysts. It is not promoted by the addition of iron, copper, nickel, molybdenum or manganese addends, for example; these have even been found partially to retard the reaction.

The reaction may be carried out intermittently in an autoclave made up of inert material (e.g. stainless steel, enameled steel, glass) receiving a solution of between about 20 and 40 weight percent of allyl acetate in acetic acid, which is heated to a temperature of between 125° and 180° C and oxidized therein with thorough agitation, by the introduction under pressure of an inert gas mixture containing air or molecular oxygen. As a matter of precaution, the oxygen-containing gas is supplied at a rate not excelling the limit of explosion, particularly within higher pressure ranges, A particularly beneficial effect of the reaction resides in the fact that it can be carried out with the use of allyl acetate/acetic acid-mixtures, such as those which are obtained by reaction of propylene and acetic acid with oxygen in gas phase and in contact with catalysts having a noble metal of group VIII of Periodic System as an active component therein. The water present in those mixtures does not interfere with the liquid phase oxidation of the present invention.

The process of the present invention, which is illustrated in the accompanying flow scheme, may also be carried out in continuous fashion, for example with the use of a reactor 1, similar to a circulation evaporator, made up of inert material (e.g. stainless steel, enameled steel, glass). To this end, air, which also promotes circulation of the material in the reactor, is introduced through line 2 downstream of a tubular heat exchanger into a solution of allyl acetate and acetic acid. Acetic acid and allyl acetate contained in the reaction gas are conveyed to condenser 3, liquefied therein and recycled to reactor 1, through lines 15 and 7. The issuing gas is expanded downstream of the condenser by passing it through overflow valve 4. Valve 4 is used to maintain the apparatus under the pressure necessary for the reaction to proceed at a satisfactory speed. The reaction mixture having glycerol acetate therein is removed from the bottom of reactor 1 through conduit 13, and conveyed to short distilling column 5, wherein allyl acetate and acetic acid are isolated as head products under a pressure of 50 mm Hg. The head products are successively condensed in condenser 6 and recycled to the reactor, through conduit 7. Glycerol acetates are the sump products. They are conveyed through conduit 8 to flash-evaporator 9, freed from residues therein, liquefied in cooler 10 and withdrawn through conduit 11.

The proportion of allyl acetate transformed into glycerol acetate is continuously replaced by fresh feed material, which is supplied to the system through conduit 14. The reaction product consists substantially of glycerol triacetate having minor proportions of glycerol diacetate therein.

The single passage of air through the apparatus may be replaced by the steps comprising recycling to reactor 1, by means of compressor 12, a portion of gas issuing from condenser 3 — the issue gas contains $CO_2$ and minor proportions of CO which originate from secondary cracking reactions — and supplying the flowing gas with concentrated oxygen at the rate necessary for oxidation. This latter procedure is preferred for its reliability as it enables the $O_2$-concentration to be maintained below the limit of explosion, in the overall system. By the removal of minor quantities of issue gas through overflow valve 4, it is also possible, and this in the absence of adverse effects upon the reaction, for the CO and $CO_2$ to be concentrated up to 95 percent by volume in the recycle gas, based on the uncondensed fraction of issue gas. This means in other words that the desensitizing inert gas consists exclusively of $CO_2$ and CO in the ratio of about 1 : 1 to 3 : 1, which is established in the course of the reaction.

Glycerol acetates are products which are useful in the manufacture of cosmetic preparations or glycerol, and useful high-boiling solvents or raw materials for making lacquers and varnishes.

The present invention provides more particularly a process for the production of glycerol triacetate and glycerol diacetate by reacting allyl acetate, acetic acid and molecular oxygen at elevated temperatures in liquid phase, which comprises reacting a solution of allyl acetate in acetic acid with an oxygen/inert gas-mixture at temperatures of between 80° and 250° C and under pressures of between 1 and 200 atm. abs. in the absence of catalysts.

Further preferred features of the present invention provide:
a. for the reaction to be carried out at temperatures of between 100° and 200° C under pressures of between 5 and 100 atm. abs.;
b. for the allyl acetate solution in acetic acid to contain up to 30 weight percent of water;
c. for the reaction to be carried out intermittently in an autoclave;

d. for the reaction to be carried out in continuous fashion by continuously supplying a reaction zone with the allyl acetate solution in acetic acid and the oxygen/inert gas mixture; subjecting the resulting reaction gas leaving the reaction zone overhead to condensation, freeing it from unreacted allyl acetate and acetic acid, and recycling liquid allyl acetate and liquid acetic acid to the reaction zone; mixing residual reaction gas with fresh oxygen and recycling the gas mixture to the reaction zone; continuously removing a crude glycerol acetate mixture from the bottom of the reaction zone; expelling unreacted allyl acetate and acetic acid under reduced pressure near the head of a first distilling zone; condensing the said unreacted allyl acetate and the said acetic acid and recycling them to the reaction zone; removing the glycerol acetates from the base of the first distilling zone; conveying the said glycerol acetates to a second distilling zone and separating them therein into glycerol triacetate and glycerol diacetate;

e. for the carbon oxides present in the recycle gas to concentrate therein up to a rate of 95 percent by volume.

The following examples illustrate the process of the present invention.

EXAMPLE 1
(Continuous operation)

Reactor 1 was continuously supplied under a pressure of 5 atm. gauge and downstream of a tubular heat exchanger with altogether 4,500 g/hr of a mixture consisting of 30 weight percent of allyl acetate, 65 weight percent of acetic acid and 5 weight percent of water, travelling through fresh air-supply pipe 14 and return collecting conduit 7. Reactor 1 was also fed, through conduit 2, with 2,000 normal liters (S.T.P.) per hour of a gas consisting of 85 percent by volume of $N_2$, 10 percent by volume of $O_2$ and 5 percent by volume of $CO_2$. A temperature of 145° C was established. The reaction gas coming from reactor 1 was cooled in condenser 3, acetic acid and allyl acetate in vapor form were condensed and liquefied therein and then recycled to reactor 1, through lines 15 and 7. The reaction gas was also recycled to reactor 1 via compressor 12 and after replacement of the oxygen consumed, through line 2. 71 g/hr of glycerol acetates which were distilled and freed from unreacted allyl acetate and acetic acid, were obtained as the reaction products, in reactor 1. 55 Weight percent was glycerol triacetate ($bp_7 = 131°$ C) and 45 weight percent was glycerol diacetate ($bp_{10} = 145°$ C). The formation of nondistillable residues was not observed. Conduit 14 was used for continuous replacement of the quantity of allyl acetate and acetic acid consumed.

EXAMPLE 2
(Discontinuous operation)

A 2-liter autoclave fitted with a lift-agitator was charged with 1 liter ( = appr. 1 kg) of a mixture of 30 weight percent of allyl acetate, 65 weight percent of acetic acid and 5 weight percent of water, and the mixture was heated to 120° C. Following this, and for reasons of precaution, air was forced thereinto in four equal rates of appr. 20 atm. gauge each to establish a total pressure of 80 atm. gauge. Only some minor absorption of $O_2$ was found to occur within 90 minutes, under these conditions. After 90 minutes, the residual gas above the liquid still contained 17.6 percent of $O_2$ and 0.6 percent of $CO_2$. Minor amounts of glycerol acetates were found to have been formed, namely appr. 10 grams of glycerol triacetate and 3 grams of glycerol diacetate.

EXAMPLES 3 to 12

Examples 3 to 12 inclusive, which are compiled in the following Table, were carried out intermittently as described in Example 2 in the same autoclave, but at various temperatures and pressures. Between 30 and 90 minutes were needed for pressure increase and reaction. As can be seen, oxygen was absorbed at high speeds from approx. 135° C upward. Heavy metal compounds, such as those which are often used for catalyzing oxidation reactions, were found to produce adverse rather than beneficial effects.

| Example Number | Reaction temperature, °C | Final pressure, atm. gauge | $O_2$-concentration in final gas | $CO_2$-concentration in final gas | Catalyst | Quantity of glycerol Triacetate, grams | Diacetate, grams |
|---|---|---|---|---|---|---|---|
| 3 | 160 | 80 | 1.1 | 2.6 | None | 93 | 18 |
| 4 | 145–155 | 80 | 1.3 | 2.4 | do | 81 | 25 |
| 5 | 135–140 | 110 | 1.1 | 3.6 | do | 112 | 21 |
| 6 | 120 | 110 | 18.1 | 0.7 | 0.5 g. $Mn(CH_3COO)_2$ | Traces | |
| 7 | 140 | 110 | 1.3 | 2.4 | 0.5 g each of iron and nickel acetate | 108 | 27 |
| 8 | 135 | 110 | 1.2 | 3.0 | 0.5 g. of $MoO_3$ | 70 | 15 |
| 9 | 135 | 60 | 14.0 | 0.9 | 0.5 g. each of iron and copper acetate | 15 | ~5 |
| 10 | 130 | 80 | 18.0 | 0.4 | 0.5 g. each of manganese and copper acetate | Traces | |
| 11 | 130 | 60 | 18.0 | 0.6 | 0.5 g. $Mn (CH_3COO)_2$ | Traces | |
| 12 | 145 | 100 | 1.3 | 3.4 | 1 g. iron acetate | 80 | 25 |

EXAMPLES 13 TO 15

| Example number | Reactor | Reaction temp., °C | Maximum pressure, atm. gauge | Mols of $O_2$ consumed | Mols of $O_2$ in $CO_2$+CO | Mols of glycerol acetates |
|---|---|---|---|---|---|---|
| 13 | Autoclave, material No. 4580 | 130–135 | 103 | 1 | 0.26 | 0.48 |
| 14 | Autoclave material No. 4580 plus 0.3% nitrilotrismethylene-phosphonic acid | 130–135 | 108 | 1 | 0.21 | 0.50 |
| 15 | Autoclave pure silver | 130–135 | 107 | 1 | 0.24 | 0.50 |

Examples 13 to 15 show clearly that chrome-nickel steel (Example 13) as construction material for the autoclave (German Standard Material No. 4580; principal constituents with the exception of iron: 17.22% Cr; 11.43% Ni; 2.3% Mo; 1.46% Mn) failed significantly to modify both the reaction velocity and yield, as compared with silver (construction material used in Example 15). The addition of 0.3 percent of a strong complex former, such as nitrilotrismethylenephosphonic acid, could equally not be found significantly to influence the reaction (Example 14). Autoclaves fitted with lift agitators were used in all of the three Examples. The oxygen absorption period was 90 minutes in each of the tree Examples. As shown in the above Table, the autoclave material could not be found to produce a catalytic effect.

EXAMPLES 16 and 17

These Examples were carried out to show that substances yielding peroxides, such as aldehydes, which are sometimes added for the purposes of inductance in liquid phase oxidations, fail to have beneficial effects upon the reaction velocity and product yield. In Example 16, a solution of 28 weight percent of pure allyl acetate in pure acetic acid was oxidized in the autoclave described in Example 2, while Example 17 was carried out with the use of an aldehyde-containing crude material obtained by gas phase oxidation of propylene with acetic acid in contact with a Pd/Au-catalyst. The absorption of oxygen was found to be complete within 90 minutes, in the two examples.

| Example Number | Material | Reaction temperature, °C. | Maximum pressure, atm. gauge | Mols of $O_2$ consumed | Mols of $O_2$ in $CO_2+CO$ | Mols of glycerol acetates |
|---|---|---|---|---|---|---|
| 16 | Batch of 28 wt. percent pure allyl acetate in anhydrous acetic acid | 130–135 | 103 | 1 | 0.26 | 0.48 |
| 17 | Batch of 28 weight percent allyl acetate, 0.5 wt percent acetaldehyde, 2.3 wt percent acrolein, 2.7 wt percent water in acetic acid. | 130–135 | 100 | 1 | 0.24 | 0.41 |

We claim:

1. A process for the manufacture of glycerol triacetate and glycerol diacetate by reacting allyl acetate, acetic acid and molecular oxygen at elevated temperatures in liquid phase, which comprises reacting a solution of allyl acetate in acetic acid with an oxygen/inert gas-mixture at temperatures of between 80° and 250° C and under pressures of between 1 and 200 atm.abs., in the absence of catalysts.

2. The process as claimed in claim 1, wherein the reaction is carried out at temperatures of between 100° and 200° C and under pressures of between 5 and 100 atmospheres absolute.

3. The process as claimed in claim 1, wherein the solution of allyl acetate in acetic acid contains up to 30 weight percent water.

4. The process as claimed in claim 1, wherein the reaction is carried out discontinuously in an autoclave.

5. The process as claimed in claim 1, wherein the reaction is carried out in continuous fashion by continuously supplying a reaction zone with the allyl acetate solution in acetic acid and the oxygen/inert gas mixture; subjecting the resulting reaction gas leaving the reaction zone overhead to condensation and thereby freeing it from unreacted allyl acetate and acetic acid, and recycling liquid allyl acetate and liquid acetic acid to the reaction zone; mixing residual reaction gas with fresh oxygen and recycling the gas mixture to the reaction zone; continuously removing a crude glycerol acetate mixture from the bottom of the reaction zone; expelling unreacted allyl acetate and acetic acid under reduced pressure near the head of the first distilling zone; condensing the said unreacted allyl acetate and the said acetic acid and recycling them to the reaction zone; removing the glycerol acetates from the base of the first distilling zone; conveying the said glycerol acetates to a second distilling zone and separating them therein into glycerol triacetate and glycerol diacetate.

6. The process as claimed in claim 5, wherein the carbon oxides present in the recycle gas are allowed to increase therein up to a rate of 95 percent by volume.

* * * * *